US005254192A

United States Patent [19]

Speakman

[11] Patent Number: 5,254,192

[45] Date of Patent: Oct. 19, 1993

[54] PROCESS FOR MATCHING COLOR OF PAINTS ON VEHICLES

[75] Inventor: Thomas P. Speakman, Media, Pa.

[73] Assignee: E. I. Du Pont de Nemours and Company, Wilmington, Del.

[21] Appl. No.: 758,428

[22] Filed: Sep. 3, 1991

[51] Int. Cl.[5] .............. B32B 35/00

[52] U.S. Cl. .............. 156/94; 29/402.09; 156/249; 427/140

[58] Field of Search .............. 156/94, 289, 249; 29/402.09, 402.18; 264/36; 427/142, 140

[56] References Cited

U.S. PATENT DOCUMENTS

| | | | |
|---|---|---|---|
| 3,470,048 | 9/1969 | Jones | 156/94 |
| 3,657,001 | 4/1972 | Parker | 427/388.3 |
| 4,061,516 | 12/1977 | George | 427/140 |
| 4,147,576 | 4/1979 | Beem | 156/94 |
| 4,497,851 | 2/1985 | de Vroom | 156/234 |
| 4,661,182 | 4/1987 | Lerner | 156/94 |
| 4,726,982 | 2/1988 | Traynor et al. | 428/213 |
| 4,732,633 | 3/1988 | Pokorny | 29/402.09 |
| 4,818,589 | 4/1989 | Johnson et al. | 428/201 |

FOREIGN PATENT DOCUMENTS

| | | | |
|---|---|---|---|
| 2814167 | 10/1979 | Fed. Rep. of Germany | 29/402.09 |
| 1098104 | 1/1968 | United Kingdom | 156/94 |

OTHER PUBLICATIONS

3m "Lay It On" Body Repair Patch Advertisement (submitted to PTO Jan. 26, 1988).

*Primary Examiner*—Michael W. Ball
*Assistant Examiner*—Daniel J. Stemmer
*Attorney, Agent, or Firm*—Hilmar L. Fricke

[57] ABSTRACT

A process for obtaining an exact color match for a repair of a painted surface of a vehicle which uses the following steps:

(1) a coating of a paint is applied to the top surface of a flexible plastic substrate that is coated on its back with a pressure sensitive adhesive layer, (2) a coating of the same paint is applied to the exterior of a vehicle to provide a painted surface, steps (1) and (2) can be performed in either order or simultaneously using the same application method such as spraying, (3) each of the coatings of paint are dried under the same or very similar conditions, (4) a damaged area of the painted surface of the the vehicle is repaired by adhering a suitable portion of coated plastic substrate prepared in step (1) to the damaged area thereby obtaining an exact color match of the painted plastic substrate and the painted surface of the vehicle.

4 Claims, 3 Drawing Sheets

PROCESS FOR MATCHING COLOR OF PAINTS ON VEHICLES

This invention is directed to a process for repairing a damaged portion of paint or coating on a vehicle to achieve an exact color match. In particular, the process uses a repair tab having the same paint or coating that was applied to the vehicle The tab is readily applied without any special equipment and still achieves an exact color match and a repair is made that is not noticeable at a normal viewing distance.

Conventionally, damaged painted automotive substrates have been repaired by spray painting either in a repair shop or by an individual using a pressurized container of spray paint. With the use of current color coat/clear coat finishes, it has become difficult to achieve a paint repair that has an acceptable color match. Usually, an entire panel must be repainted such as a door, fender or hood and this is done by a professional repair shop. Achieving a satisfactory color match with a home repair of a color coat/clear coat finish is almost impossible.

The preparation of a decorative strip having an adhesive backing which adheres to automotive paints is shown in Traynor et al U.S. Pat. No. 4,726,982 issued Feb. 23, 1988. A paint transfer article is shown in Johnson et al U.S. Pat. No. 4,818,589 issued Apr. 4, 1989. The repair of an automotive paint coating using a painted polymeric film is taught in Lerner U.S. Pat. No. 4,661,182 issued Apr. 28, 1987. But in Lerner, the film is coated using process and drying conditions that are different from those used to dry the paint film on the automobile. Therefore, an exact color match can not be achieved.

With the process of the present invention, the owner of a vehicle such as an automobile or truck can readily repair the damaged paint of his vehicle by using an adhesive backed film that has a layer of paint that is identical to the paint on the vehicle. The same paint is on the film and on the vehicle being repaired. The paint has been applied to the film and to the vehicle at the same time under the same conditions and has been dried and cured under the same conditions. An identical color match is achieved between the painted vehicle and the repair film in the event the paint on the vehicle is scratched or otherwise damaged and subsequently repaired with the repair film having a paint layer.

SUMMARY OF THE INVENTION

A process for obtaining an exact color match for a repair of a painted surface of a vehicle which uses the following steps:

(1) a coating of a paint is applied to the top surface of a flexible plastic substrate that is coated on its back with a pressure sensitive adhesive layer, (2) a coating of the same paint is applied to the exterior of a vehicle to provide a painted surface, steps (1) and (2) can be performed in either order or simultaneously using the same application method such as spraying, (3) each of the coatings of paint are dried and cured under the same or substantially the same conditions, (4) a damaged area of the painted surface of the the vehicle is repaired by adhering a suitable portion of coated plastic substrate prepared in step (1) to the damaged area thereby obtaining an exact color match of the painted plastic substrate and the painted surface of the vehicle.

BRIEF DESCRIPTIONS OF THE DRAWINGS

FIG. 3 (A) through (C) shows a schematic view of the coated flexible sheet being applied to the damage painted surface.

DETAILED DESCRIPTION OF THE INVENTION

The novel process of this invention provides for the repair of a damaged paint surface of a vehicle such as an automobile or a truck by an individual without any paint application skills. The process is particularly useful for the repair of small scratch and nicks. Previously, such repairs have been made primarily by spraying. Paint cans that are pressurized have been used by individuals but often do not provide an exact color match. Spraying paint requires a level of skill that many individuals do not have and can cause running or rough appearance from improper spray techniques. Current color coat/clear coat finishes can not be matched with a single spray application and require a second clear layer. In general, a home type repair of a clear coat/color coat finish by using conventional techniques can not be made.

Professional body shops repair by spray application of paint and to achieve an unnoticeable repair; particularly, in a clear coat/ color coat finish, the repair of an entire panel is required such as the repair of an entire door, fender or hood. Spraying of paints has the added disadvantage of giving off volatile organic solvents to the atmosphere which is restricted in many areas.

The novel process of this invention allows a layman or professional to repair a painted substrate that has been damaged for example by nicks or scratches by simply cutting a small piece of painted flexible film to the size necessary to cover the damaged paint. The backing from the adhesive layer of the film is removed and the film is positioned over the damaged paint area. A subsequent application of polish and buffing step can be done to blend in the repair.

Figure 1:
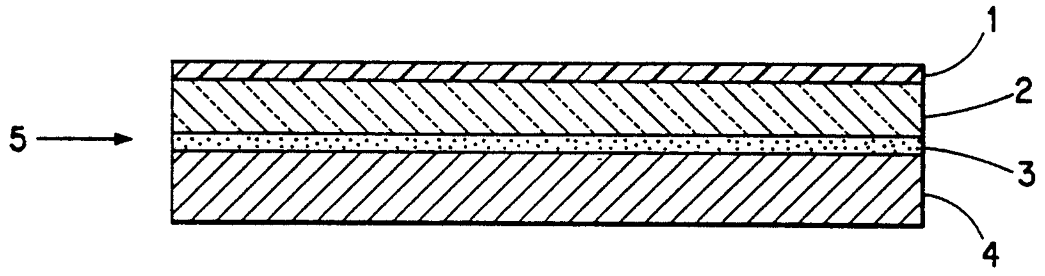
FIG. 1 shows an enlarged cross-sectional view of the flexible sheet coated on one side with a paint and having on the opposite side a layer of an adhesive and a backing sheet over the adhesive.

FIG. 1 shows a flexible transparent polymeric sheet 2 coated on its top surface with a paint layer 1 and having a pressure sensitive adhesive layer 3 adhered to it bottom surface and a backing sheet 4 over the adhesive layer. The backing sheet 4 is made of paper or the like is releasably applied over the adhesive layer.

The flexible transparent polymeric sheet 2 preferably is a polyester film such as a polyethylene terephthalate film or can be a polyolefin film such as a polypropylene film. The sheet is about 0.25–2 mils thick but preferably is about 1 mil thick.

The paint layer 1 can be a monocoat or a color coat/clear coat layer. Any of the conventional refinish paints can be used such as acrylic lacquers, acrylic enamels, acrylourethanes, alkyd enamels and the like.

The pressure sensitive adhesive layer 3 is about 1–5 mils thick and is usually applied to the polymeric sheet by a knife or roll coating operation. Typically, the adhesive is a pressure sensitive self crosslinking acrylic adhesive such as DURO TAK ® 80-1087 made by National Starch and Chemical Corporation.

A paper backing sheet 4 is applied over the pressure sensitive adhesive. The paper is siliconized as is known in the art to facilitate release of the backing sheet from the adhesive layer prior to application of the polymeric sheet to the surface that is being repaired.

Figure 2:
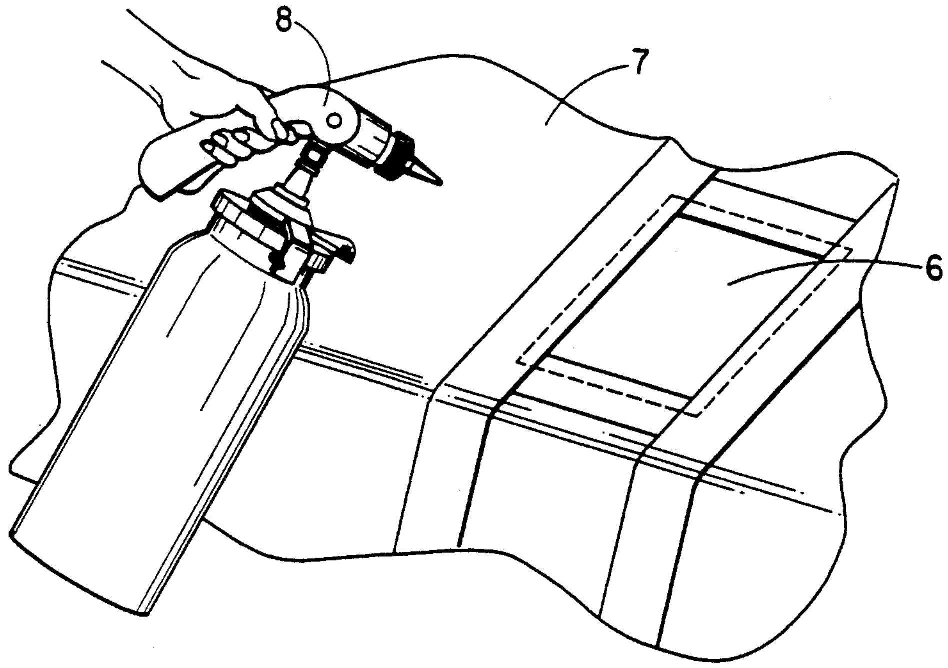
FIG. 2 shows the application of paint to the flexible sheet and to the vehicle.

FIG. 2 illustrates the preparation of the coated flexible polymeric substrate used to make repairs. A polymeric sheet 6 having an adhesive layer and a paper backing sheet is taped with masking tape into position next to the area of a vehicle which is being repaired such as the hood of an automobile 7. Paint is sprayed from the spray gun 8 onto the hood 7 and onto the polymeric sheet 6 at the same time and under the same spraying conditions. The paint on the hood and the polymeric sheet are dried and cured under the same conditions. Typically, the paint is dried and cured at ambient temperature and up to 40° C. This is the key to the process for forming a substrate that makes an unnoticeable repair since the same paint is applied and cured under the same conditions that are used for the coating of the vehicle.

Figure 3A:
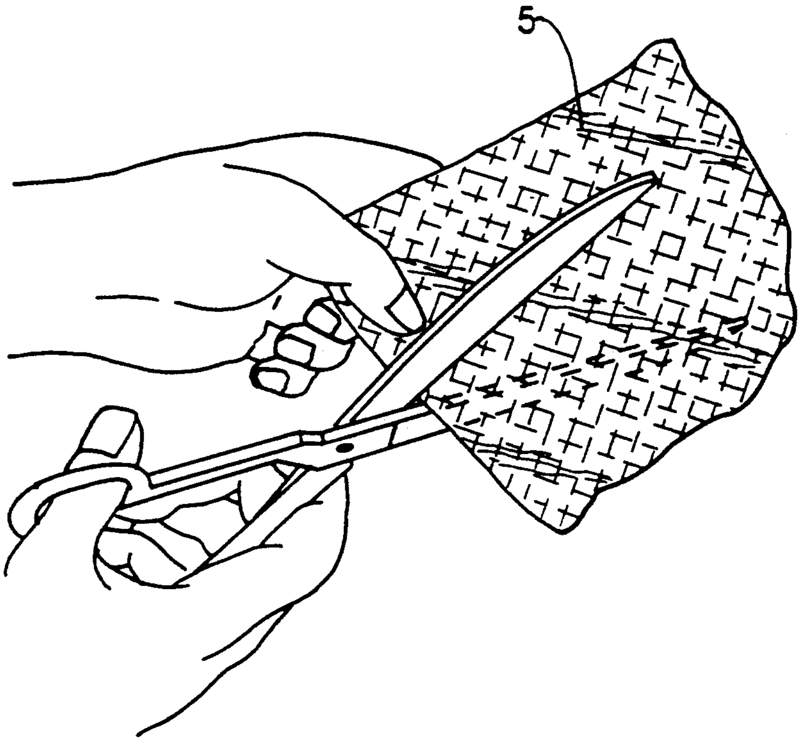
Figure 3B:
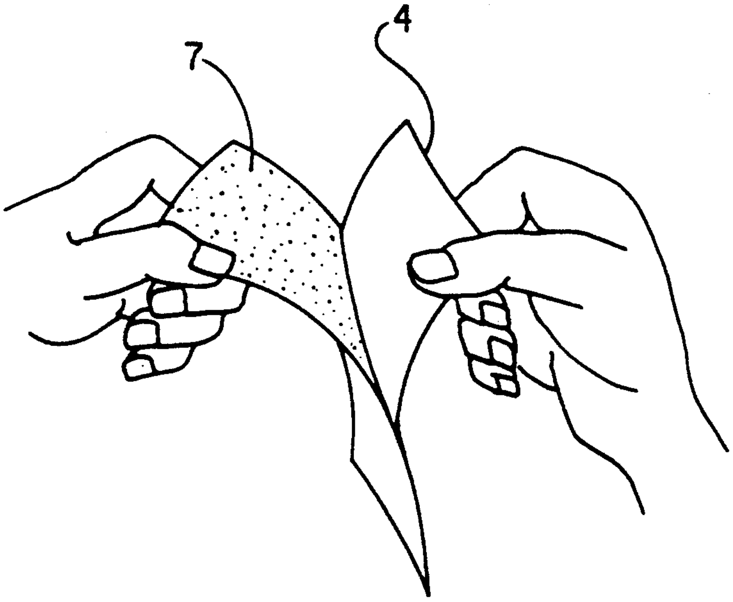
Figure 3C:
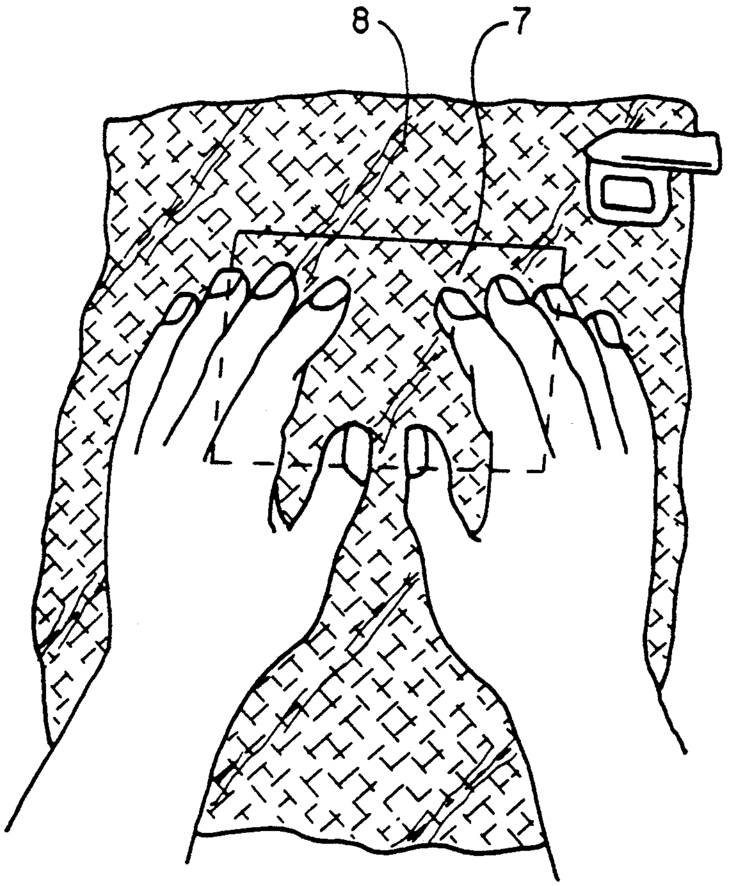

FIGS. 3A through 3C illustrate the application of the coated polymeric substrate to a damaged painted surface. In FIG. 3A, a section of the coated polymeric sheet 5 is cut to size to cover the damaged area of part of a vehicle In FIG. 3B, the paper backing layer 4 is being removed from the coated polymeric sheet 7 having a paint layer and an adhesive backing layer. FIG. 3C shows the application of the coated polymeric sheet with the adhesive layer 7 being applied to a painted substrate 8 to achieve a repair. Subsequently, a buffing or polishing compound can be applied and the entire area can be buffed to blend in the coated polymeric sheet for an unnoticeable repair.

For illustration purposes, FIG. 3A–C show a large sample of sheet being cut and applied. For most repairs which are small scratches or nicks only a very small section of sheet would be cut and applied to cover the damaged area of paint.

The following example illustrates the invention.

EXAMPLE

A 0.9 mil thick Mylar ® polyethylene terephthalate film having a 2 mil thick adhesive layer adhered to the back side and siliconized paper backing sheet over the adhesive layer is taped onto a hood as illustrated in FIG. 2 and sprayed with a paint along with the hood. The adhesive, DURO TAK ® 80-1087 made by National Starch and Chemical Corporation, is a pressure sensitive self crosslinking acrylic adhesive. The paint is Centari ® Acrylic Enamel 4737 AM Candy Apple Red. The paint on both the hood and the film are dried and cured at ambient temperature of about 25° C. to form a paint coating that has the same color and appearance on the hood and the film.

A damaged area of paint on the hood is then repaired with the above prepared coated film as shown in FIGS. 3A–3C. A section of film is cut to the size of the area that is to be repaired and the backing paper is removed and the section is placed over the damaged area and pressure is applied to adhere the film to the damaged paint. A auto polish is applied to the film and surrounding area of the hood and buffed to match the film to the paint on the hood. The resulting repair was not noticeable at a normal viewing distance.

I claim:

1. A process for obtaining an exact color match for a repair of a painted surface of a vehicle which comprises the following steps:

(1) applying a coating of a paint by spray application to the top surface of a flexible plastic substrate that has a coating on its back of a pressure sensitive adhesive layer and has a removable backing layer positioned over the pressure sensitive adhesive layer, (2) applying a coating of the same paint used in step (1) to the exterior of a vehicle to provide a painted surface, steps (1) and (2) are performed simultaneously using the same spray application method used in step (1) for applying the paint, (3) each of the coatings of paint on the flexible substrate and exterior of the vehicle are dried under the same or substantially the same conditions, where the drying temperatures used are ambient temperatures and up to 40° C., (4) a damaged area of the painted surface of the same vehicle is repaired by removing the backing layer and adhering a suitable portion of the coated plastic substrated prepared in step (1) to the damaged area thereby obtaining an exact color match of the painted plastic substrate and the painted surface of the vehicle.

2. The process of claim 1 in which the coatings for the plastic substrate and the vehicle are a color basecoat and a clear topcoat where the clear topcoat is applied before the basecoat is completely dried and cured.

3. The process of claim 1 in which the flexible plastic substrate is a polyester film.

4. The process of claim 1 in which after step (4) the damaged area which has been repaired is polished and buffed.

* * * * *